Patented Nov. 3, 1942

2,300,410

UNITED STATES PATENT OFFICE 2,300,410

VITAMIN-CONTAINING EMULSION AND PROCESS OF PRODUCING THE SAME

Charles G. Ferrari, Minneapolis, Minn., assignor to General Mills, Inc., a corporation of Delaware No Drawing. Application January 5, 1940
Serial No. 312,541

10 Claims. (Cl. 167—81)

The present invention relates to a vitamin-containing emulsion which may be used for nutritional or medicinal purposes and to its process of preparation. It relates more particularly to a vitamin concentrate which may be added to food products to impart vitamin characteristics thereto and to the process of preparing such a vitamin concentrate.

The principal object of my invention is to facilitate the fortification of food products with oil-soluble vitamins, and other medicinal and/or nutritional factors.

Another object of this invention is to provide an economical and effective process of imparting oil-soluble vitamins to food products, especially to cereal and dairy products.

A further object of my invention is to provide an oil or fat solution of an oil-soluble vitamin uniformly dispersed in a casein emulsion in which the casein emulsion serves as a vehicle for the oil or fat and the oil or fat serves as a solvent for the vitamin.

A still further object of my invention is to provide these products by a method which is independent of seasonal variations in composition of the whole milk from which evaporated milk is made.

And a still further object of my invention is to provide a vitamin containing emulsion using as ingredients only materials which are of natural food origin or which are acceptable in foods such as milk.

Heretofore, in the case of vitamin D, the most satisfactory preparation for this purpose has been an evaporated milk concentrate of vitamin D. This is satisfactory in many respects but has disadvantages that accrue from the use of evaporated milk. The vitamin D concentrate in evaporated milk is dependent upon a convenient source of evaporated milk, and has to be made substantially at the same time the evaporated milk is available. In addition, the preparation thereof has to be made in a large dairy plant, altogether out of proportion in size to the bulk of material produced.

The total weight of a vitamin concentrate is comparatively small because of the high concentration of vitamin customarily used. For example, a 5.6 ounce can of a commercial vitamin D concentrate made according to the above mentioned invention is sufficient to fortify 1500 quarts of whole milk to the level of 400 U. S. P. units of vitamin D per quart, which is the accepted level set by the American Medical Association.

The evaporated milk is also subject to seasonal variations in composition. Experience has been developed in the evaporated milk industry to allow for this in a generally satisfactory manner, as far as the evaporated milk itself is concerned. However, in the case of a special product of high value, absolute standardization of composition is desirable. This is most easily done by preparing the product from only the primary essential ingredients.

The advantages of the above mentioned evaporated milk concentrate over the prior art also apply to the present invention. Several other phases of the prior art may also be mentioned. Kropp et al. in United States Patent Number 1,919,297, issued July 25, 1933, discloses the use of water-soluble liquid amides of the lower fatty acids as solvents for the oil-soluble vitamins. These solvents are suitable carriers but will not maintain a permanently stable dispersion when used in fortification of aqueous media. Furthermore, there is a serious question as to the acceptability of these solvents to the public health authorities and more particularly to the codes governing the food industries, and particularly the milk industry.

A number of patents exist which cover the use of various emulsifying agents to stabilize an emulsion of oil-soluble vitamins in water. One of the few that discloses any truly edible materials is French Patent Number 717,067 to I. G. Farbenindustrie Aktiengesellschaft. According to that patent, the oil solution of a vitamin is spread on dry milk powder which is then added to water and stirred to produce a dispersion. Casein, dry blood, dry eggs, etc. are disclosed as equivalents of the dried milk used by the French patentee. The dispersion thus produced in water has only a relatively temporary stability which may be adequate and sufficient for a product intended for immediate consumption but is not adequate for a commercial product sold in the form of an emulsion. Furthermore, there is no provision in the French patent against bacterial decomposition, which begins almost immediately, and the French product is not homogeneously dispersed and its composition is such that it is impossible to sterilize it, and produce a stable emulsion. If this dispersion is heated to the sterilization temperature without proper adjustment of its acidity and the concentration of its components the result will be an unstable mixture in which the casein, dry blood, eggs, etc., either precipitates immediately or the vitamin-containing fraction thereof separates out of the dispersion. This is a crucial matter which is adequately provided for in applicant's invention but which is not disclosed in the above mentioned French patent and can not be applied directly thereto.

According to the present invention, all these difficulties are overcome and a stable, sterile, homogeneously dispersed, emulsion-concentrate of oil-soluble vitamins may be prepared; this product may be added to food products and dispersed in milk and other fluid materials without difficulty.

By this same invention, sterile emulsions may be prepared of other oil-soluble nutritional and medicinal ingredients.

Various vitamins may be used in preparing my improved product. For example, activated ergosterol will serve as a source of vitamin D. Fish liver oil concentrates of vitamin A and/or D are also suitable. The vitamin A may be in the form of a concentrate separated from its original bulk by molecular distillation. Other vitamins, including vitamin E, found abundantly in wheat germ oil, may be utilized.

Briefly, an alkali-metal salt of casein is used as an emulsifying agent for supporting the dispersion of an oil solution of the vitamin in water. The dispersion must be properly made. The final product then remains stable after canning and sterilizing.

As an example, in the preparation of a vitamin D concentrate, the following procedure may be practiced. 425 pounds of warm water are weighed into a tank provided with stirrers for vigorous agitation. 65 pounds of edible sodium caseinate are added slowly with continuous stirring. When most of the lumps of caseinate have disappeared, 30 pounds of melted butter are added. The stirring is continued until the lumps are substantially disintegrated. Then the vitamin concentrate is added slowly. This has been previously prepared by dissolving activated ergosterol in butter fat or butter oil, and this solution may be biologically assayed to determine the vitamin potency, which may conveniently range in this example from 100,000 to 1,000,000 U. S. P. units per gram, although it will be obvious to one skilled in the art that other potencies may be used. Stirring is continued to permit uniform distribution. The entire batch is then passed through a viscolizer or homogenizer, one or more times, at a pressure substantially within the range of 1500 to 4,000 pounds per square inch. This pressure may be varied even more, depending upon the specific procedure used and the number of times the batch is recirculated through the viscolizer or the homogenizer. This homogenization is an essential step in the process. The concentrated, homogenized product is then canned and sterilized. The sterilization may be accomplished by heating the canned product at an elevated temperature for a sufficient length of time, for example, by bringing the product up to a temperature of 240° F. in 15-20 minutes and holding the product for approximately 15 to 20 minutes at 240–245° F. while rotating the same.

The sterilized product will keep indefinitely under normal conditions of storage for canned products, and in this form is conveniently handled and shipped without the necessity of taking undue precautions when handling or shipping the product. When made according to the example, it may be added to dairy products, such as milk, without imparting any foreign taste or odor thereto.

If desired, in the above example, the vitamin concentrate may be combined with the butter oil or butter fat instead of being added separately. For many purposes, another edible oil or fat such as corn oil, or sesame oil may be used instead of butter. Also, a much smaller quantity of oil or fat than that given in the above example may be used. A quantity such as that stated above, however, contributes pleasantly to the taste, odor, and appearance of the final product.

It is practicable to prepare the alkali-metal caseinate as a part or preliminary of the process described in the above example. For example, edible casein may be added to water and the mixture agitated until all of the particles are wetted. Then sodium hydroxide, either as a solid or in solution, is added and the entire batch is stirred until reaction is complete, which requires only a few minutes. If other sodium compounds, such as the carbonate or bicarbonate are used, the reaction time is increased and the solution must be warmed to drive off the carbon dioxide in the case of the use of a carbonate or bicarbonate. The exact amount of sodium hydroxide to be added depends upon the initial acidity of the casein and the degree of addition desired between the casein and the sodium. The degree of addition is indicated for most practical purposes by the hydrogen-ion concentration of the final solution, the hydrogen-ion concentration decreasing with the addition of sodium hydroxide.

The following example will illustrate a method of preparing caseinate used in my process. 100 pounds of an edible casein are placed in a tank containing 85 gallons of water and stirred thoroughly. The hydrogen-ion concentration of the suspension thereby produced is pH 4.7. On addition of a solution containing 2.5 pounds of sodium hydroxide, the hydrogen-ion concentration changes to pH 6.9. The initial hydrogen-ion concentration of the casein suspension depends upon the method used in preparing the casein. For instance, the casein may have been precipitated from skim milk by hydrochloric acid. The degree to which the excess hydrochloric acid was removed would influence the hydrogen-ion concentration of the casein suspension.

The proportion of alkali-metal compound to be added, which is equivalent to saying the proportion of alkali-metal caseinate, may vary between fairly definite limits. Above a hydrogen-ion concentration of about pH 7.0, a considerable amount of corrosion takes place in an ordinary tin can when a product is prepared with these ingredients. Cans with enamel and lacquer linings may be used to resist corrosion at lower hydrogen-ion concentrations but are more expensive than the plain tin cans. The lower limit of alkaline material added is determined by the point where there is just sufficient alkali present to cause complete colloidal solution of the casein. This occurs in the range of pH 5.6 to 5.8. There is, of course, at least some slight solubility at all values above the iso-electric point, which varies depending upon the source of casein.

Casein from any convenient source may be used in making my improved product, provided that it has not been denatured in its preparation, which would make it impossible to put it back into colloidal solutions. Dry casein may be used, such as that made by acid precipitation, subsequently dried and pulverized. Rennet precipitated casein may be used. The casein may also be used in the wet state, as it appears after precipitation from milk and washing. Similarly, the sodium, potassium or lithium salts of casein may be prepared and carried on hand as a dry material, or they may be prepared by reaction in the solution at the time of making the final preparation. If the alkali-metal salt of casein yields a lower hydrogen-ion concentration in solution than is desired, it may be blended with some unreacted casein in the proper proportion. The invention resides not in the type of casein used, but in the finished product and the method of making it. By the term "casein" I mean the product as prepared from milk by various methods, in which the resulting casein compound contains a substantial quantity of calcium; by "alkali-metal caseinate", I mean the reaction product of the above casein compound with sodium, potassium or lithium compounds in which case there results a displacement wholly or in part of the calcium by the alkali-metal.

The hydrogen-ion concentration of my improved product is controlled either solely by adjusting the ratio of casein to alkali-metal with which it is in combination, as mentioned above, or by the additional use of buffer salts.

If circumstances require, suitable edible stabilizing and buffer salts may be used. Perhaps the most acceptable are those used in the evaporated milk industry. The following formula is an example of a final product employing stabilizing salts and showing the quantities of ingredients that may be used to yield a satisfactory product:

| | Per cent by weight |
|---|---|
| Water | 78.0 |
| Casein | 6.5 |
| Sodium caseinate | 5.5 |
| An oil or fat vitamin A concentrate | 6.3 |
| Disodium phosphate ($Na_2HPO_4.12H_2O$) | 3.4 |
| Citric acid | .65 |

The amount of caseinate (or casein-caseinate mixture) in the solution in my final product may vary within practical limits. When the proportion is raised to as high as 20 per cent, by weight, a gel results when the product is cooled. The product is very viscous at 15 per cent to 17 per cent, by weight, but is usable as a liquid carrier. At 10 per cent to 15 per cent, by weight, of casein, the viscosity of the product permits easy pouring at room temperature. Below 10 per cent, by weight, the capacity for maintaining a stable emulsion is limited. These figures are not absolute since the viscosity depends upon the particle size of the dry casein as well as upon the quantity of casein used.

The lower limit as to the percentage of fat or oil is determined only by the capacity of the fat or oil to dissolve the requisite amount of vitamin for medicinal preparations. As for the upper limits, a satisfactory product has been made containing as high as 25 per cent, by weight, of oil or fat. A high-oil or fat product may be made in the following proportions: 15 per cent, by weight, of potassium caseinate, 20 per cent, by weight, of wheat germ oil or its concentrate, or an equivalent amount of synthetic vitamin E in oil solution, and 65 per cent, by weight, of water.

Attention is directed to the fact that careful homogenization of an adequately viscous casein carrier is necessary to break up the oil or fat into globules small enough to survive sterilization without separation. When this is done, and the steps of the process are carried out as described above, there results a product which is a stable, sterile, homogenous emulsion, and which is pleasant in taste, odor and appearance. This product is particularly suited for fortifying foods with vitamins.

It is practically possible to make a preparation which contains both oil-soluble and water-soluble vitamins. These latter are incorporated by dissolving them in the aqueous phase of the emulsion. The best known water-soluble vitamins are $B_1$ (thiamin chloride), $B_2$ (riboflavin), and C (ascorbic acid). These vitamins are added to the batch with agitation before homogenization thereof to insure proper distribution.

It is apparent that a mixture of alkali-metal salts of casein, in any relative proportion, will serve the purpose of this invention. It is also intended that the term "sodium caseinate," for example, be taken to mean sodium and casein in various degrees of combination. It is further understood that either a single vitamin or a plurality of different vitamins may be dissolved in the oil or fat used in this product, and that coloring and/or flavoring agents may be added without departing from the scope of this invention.

If it is desired to produce my improved product using a stabilizing and buffer salt, this may be done by employing either a single edible salt or a combination of edible salts which have the desired buffer effect. The buffer tends to maintain a hydrogen-ion concentration of the final casin emulsion at the hydrogen-ion concentration of the buffer. Accordingly, in the preferred form of my invention, the buffer solution should have a hydrogen-ion concentration in the range of pH 5.6 to 7.0. A solution of 3.4 pounds of disodium phosphate and 0.65 pound of citric acid is in this range. For example, other soluble phosphates may be used alone in suitable quantity or these salts may be used in combination with a suitable acidic compound, such as citric acid.

While the invention has been described in detail with specific examples, such examples are illustrative and are not given as limitations, since other modifications within the spirit and scope of the invention will be apparent to those skilled in the art. Hence, the invention is to be understood as limited only as indicated, in the appended claims, in which the intent is to set forth all the novelty over the prior art.

I claim as my invention:

1. A stable, homogenized, heat-sterilized, aqueous emulsion of an oil-soluble vitamin comprising a colloidal dispersion of casein in an aqueous medium, a substantial portion of said casein being present in the form of an alkali metal caseinate; a vitamin containing oil uniformly and permanently distributed throughout said dispersion in the form of minute globules, said oil being present in an amount sufficient to dissolve the desired quantity of fat-soluble vitamin, but not in excess of 25 per cent by weight of the finished product; said casein being present in an amount sufficient to maintain said oil globules uniformly and permanently suspended, but not in excess of 20 per cent by weight of the finished product.

2. A stable, homogenized, heat-sterilized, aqueous emulsion of an oil-soluble vitamin comprising: a colloidal dispersion of casein in an aqueous medium; a substantial portion of said casein being present in the form of sodium caseinate; butter-fat or butter-oil containing oil-soluble vitamins, said butter-oil or butter-fat being uniformly and permanently distributed throughout said dispersion in the form of minute globules; said butter-fat or butter-oil being present in an amount sufficient to dissolve the desired quantity of fat-soluble vitamin, but not in excess of 25 per cent by weight of the finished product; said casein being present in an amount sufficient to maintain said oil globules uniformly and permanently suspended but not in excess of 20 per cent by weight of the finished product.

3. A stable, homogenized, heat-sterilized, aqueous emulsion of an oil-soluble vitamin comprising: a colloidal dispersion of casein in an aqueous medium, a substantial portion of said casein being present in the form of sodium caseinate; butter-fat or butter-oil containing oil-soluble vitamins, said butter-oil or butter-fat being uniformly and permanently distributed throughout said dispersion in the form of minute globules; said butter-fat or butter-oil being present in an amount approximately 6 per cent by weight of the finished product; said casein being present in an amount approximately 10 to 15 per cent by weight of the finished product.

4. A stable, homogenized, heat-sterilized, aqueous emulsion of an oil-soluble vitamin comprising: a colloidal dispersion of casein in an aqueous medium, a substantial portion of said casein being present in the form of sodium caseinate; butter-fat or butter-oil containing activated ergosterol, said butter-oil or butter-fat being uniformly and permanently distributed throughout said dispersion in the form of minute globules; said butter-fat or butter-oil being present in an amount sufficient to dissolve the desired quantity of activated ergosterol but not in excess of 25 per cent by weight of the finished product; said casein being present in an amount sufficient to maintain said oil globules uniformly and permanently suspended but not in excess of 20 per cent by weight of the finished product; the finished product having a pH slightly below 7.0.

5. A stable, homogenized, heat-sterilized, aqueous emulsion of an oil-soluble vitamin comprising: a colloidal dispersion of casein in an aqueous medium, a substantial portion of said casein being present in the form of an alkali metal caseinate; a vitamin containing oil uniformly and permanently distributed throughout said dispersion in the form of minute globules, said oil being present in an amount sufficient to dissolve the desired quantity of fat-soluble vitamin but not in excess of 25 per cent by weight of the finished product; said casein being present in an amount sufficient to maintain said oil globules uniformly and permanently suspended but not in excess of 20 per cent by weight of the finished product; said emulsion containing buffer salts to maintain a pH between 5.6 and 7.0.

6. A process of producing a stable, sterile aqueous emulsion of an oil-soluble vitamin which comprises: dispersing in an aqueous medium a quantity of casein, a substantial portion of which is in the form of alkali metal caseinate; mixing a vitamin-containing oil with the resultant casein dispersion; homogenizing the resultant mixture to form an emulsion in which said oil is uniformly and permanently distributed in the form of minute globules and which may be subjected to heat to sterilize the same without breaking said emulsion; canning said emulsion and sterilizing the same by heat; said oil being present in an amount sufficient to dissolve the desired quantity of fat-soluble vitamin but not in excess of 25 per cent by weight of the finished product; said casein being present in an amount sufficient to maintain said oil globules uniformly and permanently suspended but not in excess of 20 per cent by weight of the finished product.

7. A process of producing a stable, sterile aqueous emulsion of an oil-soluble vitamin which comprises: dispersing in an aqueous medium a quantity of casein, a substantial portion of which is in the form of sodium caseinate; mixing with the resultant casein dispersion, butter-fat or butter-oil containing an oil-soluble vitamin; homogenizing the resultant mixture to form an emulsion in which said butter-fat or butter-oil is uniformly and permanently distributed in the form of minute globules and which may be subjected to heat to sterilize the same without breaking said emulsion; canning said emulsion and sterilizing the same by heat; said butter-fat or butter-oil being present in an amount sufficient to dissolve the desired quantity of fat-soluble vitamin but not in excess of 25 per cent by weight of the finished product; said casein being present in an amount sufficient to maintain said oil globules uniformly and permanently suspended but not in excess of 20 per cent by weight of the finished product.

8. A process of producing a stable, sterile aqueous emulsion of an oil-soluble vitamin which comprises: dispersing in an aqueous medium a quantity of casein, a substantial portion of which is in the form of sodium caseinate; mixing with the resultant casein dispersion, butter-fat or butter-oil containing an oil-soluble vitamin; homogenizing the resultant mixture to form an emulsion in which said butter-fat or butter-oil is uniformly and permanently distributed in the form of minute globules and which may be subjected to heat to sterilize the same without breaking said emulsion; canning said emulsion and sterilizing the same by heat; said butter-fat or butter-oil being present in an amount approximately 6 per cent by weight of the finished product, said casein being present in an amount approximately 10 to 15 per cent by weight of the finished product.

9. A process of producing a stable, sterile aqueous emulsion of an oil-soluble vitamin which comprises: dispersing in an aqueous medium a quantity of casein, a substantial portion of which is in the form of sodium caseinate; mixing with the resultant casein dispersion, butter-fat or butter-oil containing activated ergosterol; homogenizing the resultant mixture to form an emulsion in which said butter-fat or butter-oil is uniformly and permanently distributed in the form of minute globules and which may be subjected to heat to sterilize the same without breaking said emulsion; canning said emulsion and sterilizing the same by heat, said oil being present in an amount sufficient to dissolve the desired quantity of activated ergosterol but not in excess of 25 per cent by weight of the finished product, said casein being present in an amount sufficient to maintain said oil globules uniformly and permanently suspended but not in excess of 20 per cent by weight of the finished product.

10. A process of producing a stable, sterile aqueous emulsion of an oil-soluble vitamin which comprises dispersing in an aqueous medium a quantity of casein, a substantial portion of which is in the form of alkali metal caseinate, mixing a vitamin-containing oil with the resultant casein dispersion, homogenizing the resultant mixture to form an emulsion in which said oil is uniformly and permanently distributed in the form of minute globules and which may be subjected to heat to sterilize the same without breaking said emulsion, incorporating in said emulsion sufficient buffer salts to maintain the pH between 5.6 and 7.0; canning said emulsion and sterilizing the same by heat, said oil being present in an amount sufficient to dissolve the desired quantity of fat-soluble vitamin but not in excess of 25 per cent by weight of the finished product, said casein being present in an amount sufficient to maintain said oil globules uniformly and permanently suspended but not in excess of 20 per cent by weight of the finished product.

CHARLES G. FERRARI.